July 7, 1953

O. E. WOLFF ET AL 2,644,755

PHOTOGRAPHIC PRODUCT FOR CARRYING OUT
A ONE-STEP PHOTOGRAPHIC PROCESS

Filed Dec. 9, 1947

Otto E. Wolff
and
Murry N. Fairbank
INVENTORS

BY Donald C. Brown
and
Oliver W. Hayes
Attorneys

July 7, 1953

O. E. WOLFF ET AL 2,644,755

PHOTOGRAPHIC PRODUCT FOR CARRYING OUT
A ONE-STEP PHOTOGRAPHIC PROCESS

Filed Dec. 9, 1947

INVENTORS
Otto E. Wolff
and
BY Murry N. Fairbank
Donald L. Brown and
Oliver W. Hayes
Attorneys Patented July 7, 1953

2,644,755

UNITED STATES PATENT OFFICE 2,644,755

PHOTOGRAPHIC PRODUCT FOR CARRYING OUT A ONE-STEP PHOTOGRAPHIC PROCESS

Otto E. Wolff, Cambridge, and Murry N. Fairbank, Belmont, Mass., assignors to Polaroid Corporation, Cambridge, Mass., a corporation of Delaware Application December 9, 1947, Serial No. 790,454

14 Claims. (Cl. 95—8)

1

This invention relates to photography and more particularly to novel photographic products.

A principal object of the present invention is to provide improved photographic products for use in processes of the type where a processing liquid is released from a container and spread between a photosensitive layer and another layer, the processing preferably comprising the concurrent development of a latent negative image and the formation of a positive on the other layer.

Another object of the invention is to provide such a product wherein improved means are included on one of the layers for trapping excess liquid spread beyond a predetermined area thereof which is to carry the positive or negative image.

Still other objects of the invention are to provide such trapping means which are simple to manufacture, which are cheap, which are reliable in operation, which may aid the release of liquid from a following container, and which can serve as a reinforcing means for that portion of a layer used to position the product in a predetermined relation to portions of a camera device.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
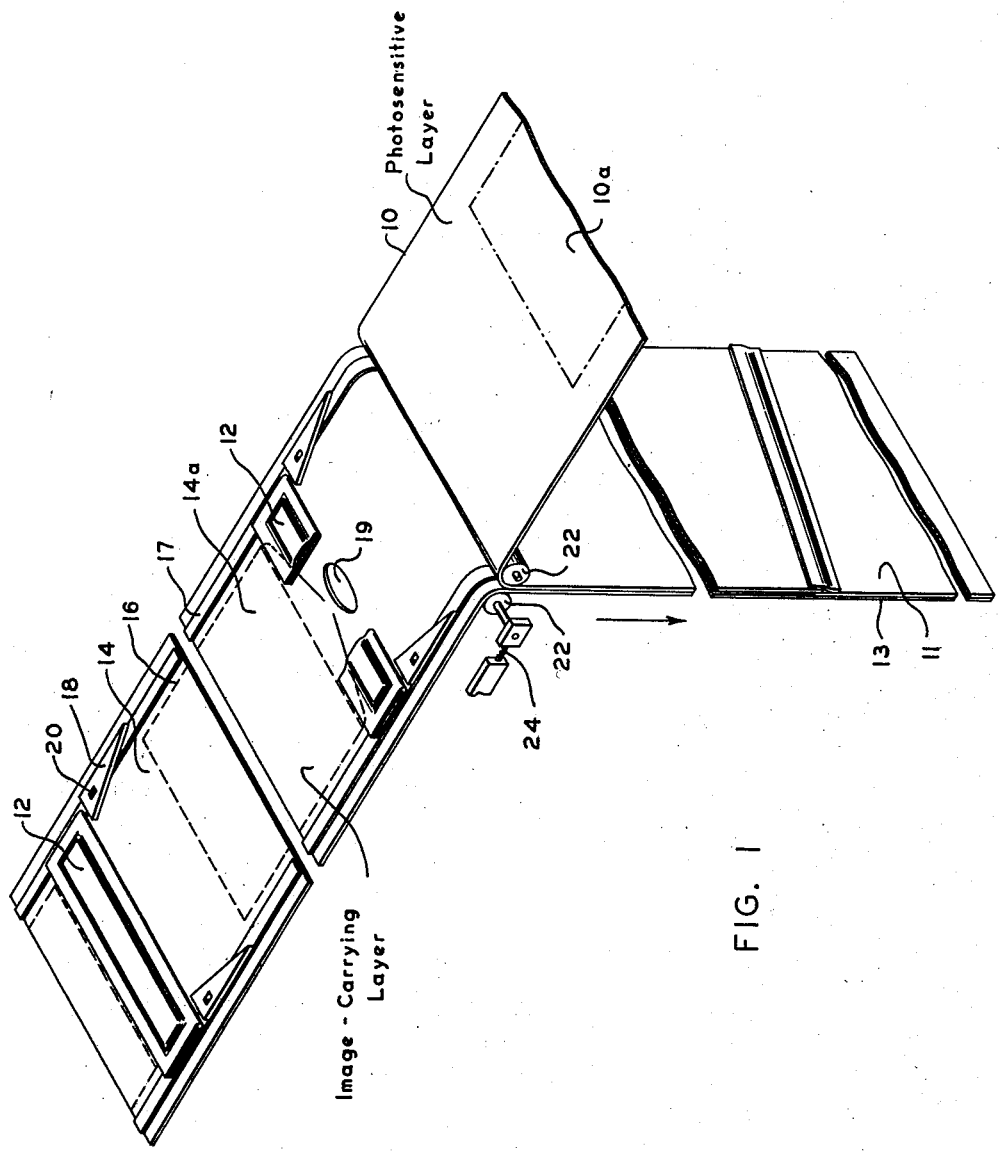
Figure 1 is a schematic, fragmentary, isometric view of a preferred form of the product of the present invention during the use thereof.
Figure 4:
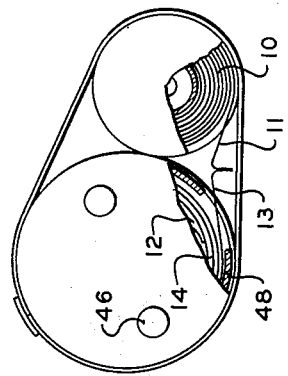
Fig. 4 is a schematic sectional view of the product showing the arrangement of parts thereof before loading in a camera.

This invention relates generally to a composite photographic product comprising a layer of sheetlike material carrying on one surface thereof at least one container releasably confining a photographic processing liquid and an improved trap, spaced from the container, for trapping excess liquid spread towards said trap from the container, the present invention being primarily concerned with traps which simplify the construction and operation of the product of the invention. In a preferred form of the invention, the product includes a roll of said sheetlike material, carrying a plurality of said containers and said novel traps predeterminedly spaced from each other on one surface thereof. The product also preferably includes a roll of photosensitive material, leading ends of the two rolls being preferably secured together. The trapping members, constituting each trap, operate on the principle of separating the inner surfaces of the layers a predetermined amount so as to increase the volume-to-area ratio of the lamination comprising the two layers between which the layer of liquid is spread.

The liquid in the container is preferably capable, when spread between corresponding areas of said two layers, of accomplishing a predetermined processing of at least exposed areas of the photosensitive layer. This liquid is releasable by the application of a predetermined mechanical stress to the container therefor, such as occurs, for example, when the product is passed through a pair of pressure rolls. This processing preferably comprises the concurrent development of a latent negative image in the photosensitive layer and the formation of a positive image on the other layer, hereinafter referred to as an image-carrying layer.

Each of the containers is preferably secured transversely to its associated layer adjacent the transverse edge of that area thereof which is to carry either the positive or negative image. The spacing between the containers roughly defines these image areas and the image areas are more closely defined by the spacing between each container and its associated trap. Each container is preferably capable of releasing its contained liquid along one edge thereof for spreading towards the next succeeding container, the trap associated with this container being positioned adjacent said next succeeding container.

For assuring that the image area to be exposed in the camera is brought into coincidence with the area of the image-carrying layer which is to receive the positive image from the exposed photosensitive layer, one or both of the layers are preferably so arranged that moving of the container into a predetermined position with respect to a processing means in the camera is indicated to the user thereof. When the container is in this position, that area of the photosensitive layer to be brought into coincidence with the positive image area on the image-carrying layer is aligned with the exposure framing means in the camera.

In the preferred form of the invention, the photosensitive layer comprises a continuous sheet of photosensitive material and the image-carrying layer comprises a continuous sheet of a material suitable for forming the background for a positive image comprising silver. When the containers are secured to the surface of the image-carrying layer, the leading edge thereof, i. e., that edge which first enters the bite of the processing rolls, is considerably raised above the image-carrying layer and is apt to cause an increase in pull necessary to pass the container between the pressure rolls. In the present invention, sudden increases in pulling force are obviated by the use of a trap portion whose ability to separate the pressure rollers increases away from the trailing edge of the image area so that there is accomplished a gradual separation of these pressure rollers. This trap portion comprises at least one trap member having a dimension parallel to the edge of the container and a dimension normal to the image-carrying layer, one of these dimensions preferably increasing along said member as measured from the positive image area to the next succeeding container. In a preferred form of the invention, the end of the trap is immediately adjacent the next succeeding container and has the same approximate height as the leading edge of the next succeeding container so that the pressure rolls pass smoothly from the end of the trap to the next succeeding container without causing any increase in pulling force.

Referring now to Fig. 1, there is shown a schematic, isometric view of a preferred form of the product of the invention in the use thereof, portions being cut away for clarity of illustration. There is shown a photosensitive layer 10 with its photosensitive surface extending upwardly, an image area being indicated at 10a on this surface, this area 10a being that area which is in exposure position when a container 12 is in a predetermined position with respect to a processing member of the camera. On that surface of an image-carrying layer 14, which is to be brought into face-to-face coincident relationship with the photosensitive image area 10a, there is shown a positive image area 14a, this area being roughly defined by the distance between a pair of containers 12. In a preferred form of the invention, positive image area 14a is completely defined by a series of perforations 16 extending around the periphery thereof. For the purpose of trapping excess spread liquid there is provided a trap which preferably comprises a pair of short strips 18 tapered transversely of layer 14 and positioned adjacent marginal portions of the trailing edge of each image area 14a. It can be seen that these strips 18 closely abut the next succeeding container and that they have holes 20 extending therethrough. There are also provided leader portions 11 and 13 for the photosensitive and image-carrying layers respectively.

Also shown in Fig. 1 is a pair of processing members which are schematically indicated at 22 in the form of a pair of pressure rolls. In a preferred form of camera, one of the pressure rolls 22 is fixedly mounted and the other is placed under a resilient load by a means such as a spring, schematically indicated at 24. For controlling the thickness of spread liquid there are preferably provided spacer strips 17 secured to marginal portions of the image-carrying layer.

Figure 2:
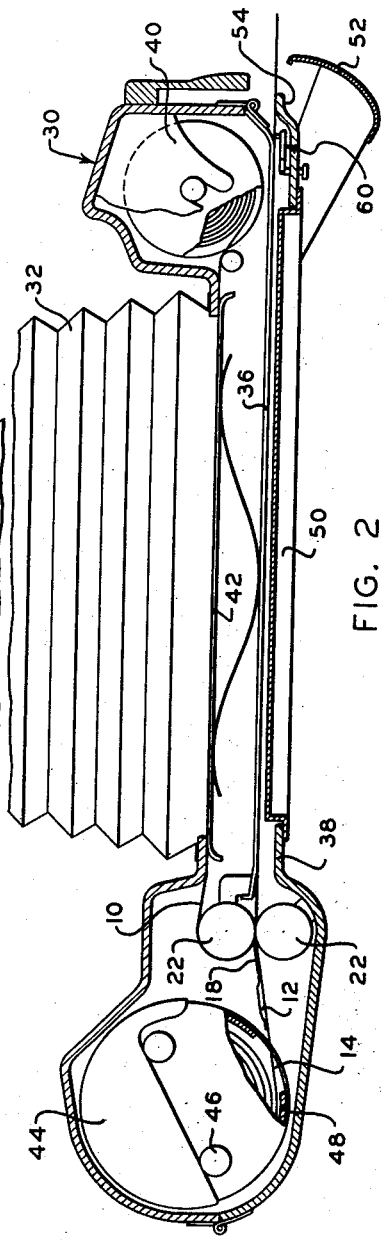
Fig. 2 is a schematic, fragmentary sectional view of the product of Fig. 1 mounted in a camera device.

Referring now to Fig. 2 there is shown one type of camera apparatus with which the present invention is particularly useful, Fig. 2 being a diagrammatic sectional view where like numbers refer to like elements in the other figures. This camera comprises generally a housing 30 having a bellows 32 and a lens and shutter assembly 34. In the back of the housing 30 there is an inner partition 36 and an outer cover 38. Adjacent the right-hand end of plate 36 is provided a holder 40 for the roll of photosensitive material 10. The inner partition 36 preferably carries one pressure roll 22 and the outer cover 38 preferably carries the other pressure roll 22. Partition 36 also preferably carries a backing plate 42 which holds the photosensitive layer 10 in the focal plane of the camera. For holding the image-carrying roll in a predetermined position there are provided members 44 adapted to engage protuberances 46 on the ends of a container 48 for the image-carrying layer 14. A door 50 is provided in the outer cover 38 and a swinging cutter bar 52 is hingedly secured to cover 38 adjacent an end 54 thereof which defines an exit for the leader portions of the product. Suitable light seals are provided. Further details of construction of such a camera are given in the copending application of Joseph F. Carbone and Murry N. Fairbank, Serial No. 780,344, filed October 17, 1947 (now Patent No. 2,455,111, issued November 30, 1948).

In the use of the product and camera described above in connection with Figs. 1 and 2, the outer cover 38 and inner partition 36 are swung open to permit loading of the product. The roll of photosensitive material is then placed in holder 40, the leader 11 is drawn across backing plate 42 and around the roll 22 carried by partition 36. Then partition 36 is pushed to its closed position shown in Fig. 2 and the container 48 is placed in the camera, it being positioned so that protuberances 46 rest against the holder 44. The two leaders 11, 13 are then pulled as a unit along the outer surface of partition 36 until they extend beyond the right-hand end 54 of the camera. The outer cover 38 is now closed, thus light-sealing all of the material within the camera. At this point, substantially all of the leader portions of the two layers have been removed from their respective rolls.

The two leaders are now pulled until positioning of the container in proper relation to the processing means is indicated. This is preferably accomplished by means of a stop schematically indicated at 60 which engages holes 20 in the image-carrying layer 14. The user of the camera now knows that a predetermined area 10a of the photosensitive layer is in position to be exposed. At this point, all excess leader material may be cut off against the cutter bar 52, if desired, the cutter bar being moved downwardly when it is desired to grasp the uncut portions of the leaders extending from the camera beyond end 54 of cover 38.

Exposure is made and the two leaders are again pulled. During the commencement of pull, the passage of the container 12 between the pressure rolls increases the hydraulic pressure therein to the point where the liquid is forced out of the trailing edge of the container. As the pull continues, the liquid is spread between the two layers in a thin layer having a thickness approximately the thickness of the two spacer strips 17, the liquid acting to bond the photosensitive and image-carrying layers together as a unit and to carry out the formation of the positive image on area 14a which is in coincidence with exposed area 10a. As the trapping strips 18 pass through the rolls their tapered construction causes a gradual separation of the pressure rolls, the pointed end being more or less squashed by the high unit pressure thereon. Thus, the gradual separation of the rolls does not give a great increase in pulling pressure but does increase the volume-to-area ratio between the layers 10 and 14 so that the excess liquid is no longer spread and is trapped within this volume. As the stop 60 engages a hole 20, the pulling pressure is greatly increased, thus indicating to the user of the camera that one area 10a has been mechanically processed and that the next area 10a is in position for exposure. The stop 60 may be preferably positioned so that when one stop hole 20 is between the pressure rolls, the preceding stop hole 20 is engaged by stop 60. It can thus be seen that the trap member 18, in addition to its trapping function, also reinforces the hole 20, thus allowing a positive action by the stop 60 without danger of tearing the image-carrying layer 14.

After a predetermined time, depending upon the materials involved, the formation of the positive image is completed and the door 50 may be opened to allow the user of the camera to remove the positive image area 14a. This is most readily accomplished by inserting a fingernail into a hole 19 and tearing the image-carrying layer along lines 16.

When the next image area is exposed, it is processed in the same manner as the previous image area, that portion of the product extending out of the right-hand end of the camera being used to move the two layers into coincidence through the pressure rolls. The fact that the preceding portions of the image-carrying and photosensitive layers are bonded together by the spread liquid is of considerable assistance in maintaining the two layers in registration during the use of the product. Thus, as the used portions of the product are torn off by the cutter bar there remains a pair of laminated layers (minus area 14a) extending between the pressure rolls and the end of the cutter bar, this pair of layers acting as a single layer.

Figure 3:
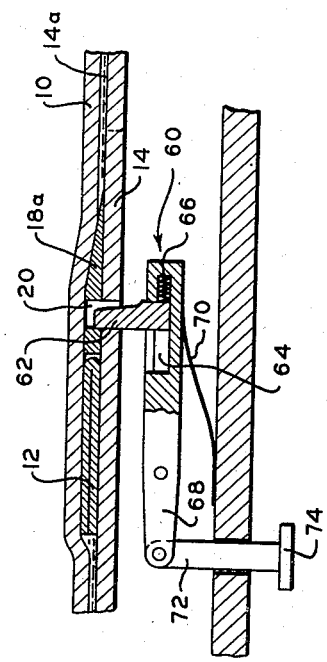
Fig. 3 is a schematic, fragmentary sectional view of a modification of the product of the invention, showing the stop mechanism of Fig. 2 in somewhat greater detail.

Referring now to Fig. 3, there are shown further details of the stop 60 and another preferred modification of the trap wherein the trap is tapered in a direction normal to the surface of the sheet upon which it is secured. In this figure the trap is represented by 18a and is shown as a relatively incompressible member secured to the image-carrying layer 14. That end of the trap 18a which is adjacent the image area 14a tapers down to a thin point which offers a very slight increase in pull force as the trap enters the pressure roll. The other end of the trap is substantially as thick as the leading (right-hand) edge of the succeeding container 12, and preferably as incompressible as this leading edge.

The stop 60, shown generally in Fig. 2 and more specifically in Fig. 3, comprises a stop detent 62 carried on a slide 64 and normally held to the left end of the slide by a spring 66. The slide 64 is formed in a pivoted arm 68 which is urged in a counter-clockwise direction by a spring 70. Another arm 72, having an operating button 74 on the end thereof, is provided for rotating arm 68 in a clockwise direction. In the use of the stop mechanism described above, assume that an image has been processed and the parts of the product and apparatus bear the relationship shown in Fig. 3. The user of the camera, desiring to move the layers, pushes button 74 upwardly, thus rotating arm 68 in a clockwise direction and moving stop detent 62 out of hole 20 which extends through trap 18a and image-carrying layer 14. As soon as detent 62 is freed from hole 20 it is moved to the left side of slide 64 by the spring 66. Thus, when the button 74 is released and the arm 68 is urged in a counter-clockwise direction by spring 70, the detent 62 cannot engage hole 20 since it is too far to the left. When the next hole 20 comes opposite detent 62, this detent is forced into the hole by spring 70 and the detent moves with the hole until it abuts the right-hand end of slide 64, compressing spring 66 during this movement. The elements of Fig. 3 are again in the position shown. In a preferred form of the invention, the button 74 is moved upwardly by the movement of the cutter bar 52 into position for cutting off the preceding portions of the product.

During the use of the tapered trap 18a it gradually separates the pressure rolls 22, thus giving a volume between the sheets in which the liquid may be trapped. When the thickest part of the trap 18a is between the pressure rolls, they are separated by a distance approximately equal to the separation required for entrance of the leading edge of the succeeding container therebetween. Thus, there is no increase in pull as the rollers pass from the trap to the succeeding container.

While several preferred forms of the invention have been shown wherein the trap portions of the product are capable of gradually separating the pressure members, these forms are merely illustrative and are subject to considerable variations without departing from the scope thereof. For example, the trap member may comprise a plurality of sheets, such as cellophane, of decreasing width placed on top of each other to provide a plurality of steps of increasing thickness. It may comprise a base having a doctored tapered surface thereon. It may be tapered both transversely and normally of the sheet. The two trapping members may be secured together at their ends adjacent the succeeding container, in which case they may be stamped from a single sheet of material. The trapping members may have transverse scoring to increase their longitudinal flexibility so as to aid in rolling up the layer supporting the traps.

A preferred form of the invention comprises the following materials. The image-carrying layer 14 is formed of a sheet of single-weight baryta paper. The edge strips 17 are formed of kraft paper approximately .0035 inch thick. The transversely tapered trapping members 18 are preferably about 1 inch long by ¼ inch wide and are made of a semi-crepe paper tape about .015 inch thick. When such trap members are used with pressure rolls 22 of about $\frac{7}{8}$ inch in diameter under a 7 to 10 pound load, the thin point of the trap member is crushed by the rolls while the thicker trailing portion of the trap member is relatively uncompressed. The normally tapered traps 18a of Fig. 3 are preferably formed of hard calendered paper or cardboard having a skived taper. The containers are formed of a paper-backed metal foil having an alkali-inert inner coating of polyvinyl butyral and a strip of ethyl cellulose along the sealed edge as described in the copending application of Edwin H. Land, Serial No. 652,612, filed March 7, 1946.

The container is preferably secured to the image-carrying layer by means of a strip of an adhesive, for example polyvinyl butyral, applied to the bottom of the leading edge thereof. The leading edge is then flattened and sealed to the image-carrying layer by pressing downwardly with a heated narrow iron, for example.

In one preferred form of the invention, the photosensitive layer 10 comprises a suitable paper base upon which is coated a "fast" gelatino silver iodobromide photosensitive emulsion. For use with such an emulsion, a preferred liquid composition includes the following ingredients in the relative proportions given below:

Example 1

| | Grams |
|---|---|
| Water | 1860 |
| Sodium carboxymethyl cellulose (medium viscosity) | 82.4 |
| Sodium carboxymethyl cellulose high viscosity | 10.6 |
| Sodium sulfite | 78 |
| Sodium hydroxide | 74.6 |
| Sodium thiosulfate | 14.5 |
| Citric acid | 38.5 |
| Hydroquinone | 52.0 |
| Chlorobenzotriazole | 1.5 |

One preferred image-carrying layer 14 is prepared for use with the above photosensitive layer and liquid developer composition as set forth in the following nonlimiting example:

Example 2

A solution A is prepared by adding 60 grams of cadmium acetate, 2 grams of lead acetate and 60 grams of zinc nitrate to 200 cc. of water. Solution B is prepared by adding 28 grams of sodium sulfide and 300 grams of silica aerogel to 2800 cc. of water. Solution C is prepared by adding 160 cc. of solution A to 500 cc. of solution B and thoroughly mixing. The resulting mixture is then applied to the surface of the baryta paper by dipping the sheet into a bath of the mix and removing the excess mix from the sheet, as it leaves the bath, by means of a soft rubber buffing roll which rotates in a direction opposite to the direction of travel of the sheet.

When the product, prepared as set forth in accordance with Examples 1 and 2, is processed by spreading the liquid between the photosensitive and image-carrying layers, the developer develops exposed silver halide grains and the sodium thiosulfate, concurrently with the development, forms soluble silver complexes with unexposed silver halide grains. These complexes migrate to the image-carrying layer where they are converted to a positive image comprising silver, the sulfide slowly released from the surface of the image-carrying layer forming silver sulfide specks around which large silver grains are formed. The cadmium acetate and zinc nitrate are slowly released to lower the alkalinity of the liquid to a point where oxidation of the excess developer does not occur. Meanwhile, the sodium carboxymethyl cellulose is forming a dimensionally stable film which adheres to the surface of the image-carrying layer. The above-described reactions (with the exception of the lowering of the pH) are completed in about 1 minute and the positive image area is then separated from the lamination comprising the photosensitive and image-carrying layers. As explained above, this separation is preferably accomplished by opening door 50, inserting a fingernail through hole 19 and tearing the image-carrying layer along lines 16, thus revealing the final stable positive image.

While preferred forms of the invention have been described above, numerous other modifications thereof are possible without departing from the scope thereof. For example, the containers and novel traps of the present invention may be secured to the photosensitive rather than the image-carrying layer. Equally, numerous other processing liquids may be employed with numerous types of photosensitive materials and image-carrying layers of the type described in the copending application of Edwin H. Land, Serial No. 729,578, filed February 19, 1947. The liquid in the container may carry only a part of the processing reagents and others may be included in solid form in the sheets.

Other inventions which are related to the invention set forth herein and which, like the present invention, are the property of a common assignee are the applications of: Edwin H. Land, Serial No. 782,117, filed October 25, 1947 (now Patent No. 2,579,587); William J. McCune, Jr. and Howard G. Rogers, Serial No. 6,058, filed February 3, 1948; Edwin H. Land, Serial No. 64,870, filed December 11, 1948 (now Patent No. 2,543,181); Howard G. Rogers, Serial No. 77,362, filed February 19, 1949; Edwin H. Land, Serial No. 87,911, filed April 16, 1949; Edwin H. Land, Serial No. 87,912, filed April 16, 1949; William J. McCune, Jr., Serial No. 116,385, filed September 17, 1949 (now abandoned and replaced by Serial No. 255,995, filed November 13, 1951); and Edwin H. Land, Serial No. 141,905, filed February 2, 1950 (now Patent No. 2,612,449).

Since certain changes may be made in the above product without departing from the scope of the invention, herein involved, it is intended that all matter contained in the above description or shown in the accompanying drawings shall be interpreted as illustrative and not in a limiting sense.

What is claimed is:

1. A photographic product comprising a sheet support, a rupturable container holding a photographic processing liquid, said liquid including a thickening agent for increasing the viscosity thereof, said container being carried on said sheet support for bodily movement therewith and having a liquid-dispensing mouth positioned to extend transversely of said sheet support and through which the container contents are adapted to be released and discharged upon rupture of said container by the application thereto of opposed compressional forces directed from opposite sides of said sheet support and applied substantially uniformly across said sheet support by pressure-applying elements located on opposite sides of said support, at least a part of the face of said support on which said container is carried providing a spreading surface which extends longitudinally of said support in a direction away from the mouth of said container and over which liquid discharged from said container is adapted to be spread upon relative movement between said sheet support and said compressional forces, said spreading surface having an elongated portion extending longitudinally of said sheet support from adjacent the mouth of said container and providing an image-carrying portion for a photographic image adapted to be formed thereon upon release of said liquid, said spreading surface also having a trapping portion on which liquid in excess of that spread over the image-carrying portion is adapted to be collected and trapped, said trapping portion providing an extension of said spreading surface beyond the end of said image-carrying portion which is furthest removed from said container and carried on said trapping portion of said spreading surface for bodily movement with said sheet support, at least one tapered and durable member which is capable of retaining its general shape under the application of pressure to opposed surfaces thereof and which occupies an area of said sheet support that is substantially smaller than the area of said trapping portion, each said tapered member having a face thereof extending above said spreading surface of said sheet support and also having at least one face provided with edges which diverge in a direction longitudinally of said support and away from the image-carrying portion of the support and which impart a cross-sectional area to said tapered member which increases in said direction whereby said tapered member is capable of gradually separating said elements as said tapered member becomes engaged between said elements upon relative movement of said sheet support with respect to said compressional forces to arrest the spreading of said liquid and to produce a space between the trapping portion of the spreading surface of said sheet support and that pressure-applying element which overlies said spreading surface for collecting and trapping said liquid on parts of said trapping portion adjacent said tapered member.

2. A photographic product as defined in claim 1 wherein said tapered member has a pointed end located adjacent said image-carrying portion of said spreading surface of said sheet support.

3. A photographic product as defined in claim 1 wherein said tapered member has a hole therethrough providing means, engageable with camera stop mechanism, for positioning said sheet support in predetermined relation to means for applying said compressional forces to said sheet support.

4. A photographic product as defined in claim 1 wherein said image-carrying portion of said spreading surface of the sheet support comprises a photosensitive silver halide and wherein the liquid in said container includes a silver halide developer.

5. A photographic product as defined in claim 1 wherein said tapered member comprises a substantially solid material.

6. A photographic product as defined in claim 1 wherein said tapered member is substantially solid and comprises a fibrous material.

7. A photographic product as defined in claim 1 wherein said tapered member comprises paper.

8. In a photographic product, in combination, a sheet support, at least a part of one face of said sheet support providing a spreading surface which extends longitudinally of said sheet support and over which there is adapted to be spread a photographic liquid processing composition including a thickening agent for increasing the viscosity of said liquid, a rupturable container holding said liquid and carried on said face of said sheet support for bodily movement therewith at a location adjacent an end of said spreading surface, said container having a discharge mouth which extends transversely of said sheet support at a position for releasing the container contents, upon rupture of said container, onto said spreading surface, including the end of the spreading surface adjacent said container, said container being adapted to be ruptured and the contents thereof discharged by the application thereto of opposed compressional forces directed from opposite sides of said sheet support and applied substantially uniformly across said sheet support by pressure-applying elements located on opposite sides of said support, said discharged liquid being adapted to be spread over said spreading surface by relative movement between said sheet support and said compressional forces, said spreading surface having an elongated portion extending longitudinally of said sheet support from adjacent the mouth of said container and providing an image-carrying portion for a photographic image adapted to be formed thereon upon release of said liquid, said spreading surface also having a trapping portion over which liquid in excess of that spread over said image-carrying portion is adapted to be collected and trapped, said trapping portion providing an extension of said spreading surface beyond the end of said image-carrying portion which is furthest removed from said container, and a pair of tapered and durable members each of which is capable of retaining its general shape under the application of pressure to opposed surfaces thereof and carried on said trapping portion of said spreading surface for bodily movement with said sheet support, said tapered members being aligned transversely of said sheet support in spaced relation at locations adjacent the opposite longitudinal edges of said spreading surface of said sheet support, each said tapered member of said pair having a face thereof extending above said spreading surface of said sheet support and also having at least one face provided with edges which diverge in a direction longitudinally of said support and away from the image-carrying portion of the support and which impart a cross-sectional area to each said tapered member of said pair which increases in said direction whereby said tapered members are capable of gradually separating said elements as said tapered members become engaged between said elements upon relative movement of said sheet support with respect to said compressional forces to arrest the spreading of said liquid and to produce a space between the trapping portion of the spreading surface of said sheet support and that pressure-applying element which overlies said spreading surface for collecting and trapping said liquid on parts of said trapping portion adjacent said tapered members.

9. A photographic product as defined in claim 8 wherein the width dimension of each tapered member increases.

10. A photographic product as defined in claim 8 wherein the thickness dimension of each tapered member increases.

11. A photographic product as defined in claim 8 wherein the width and thickness dimensions of each tapered member increase.

12. A photographic product as defined in claim 8 wherein each said tapered member has a hole therethrough providing means, engageable with camera stop mechanism, for positioning said sheet support in predetermined relation to means for applying said compressional forces to said sheet support.

13. A photographic product comprising an elongated sheet support, a plurality of rupturable containers, each holding a liquid photographic processing composition including a thickening agent for increasing the viscosity of said liquid, said containers being carried on one side of said sheet support for bodily movement with said support and positioned at substantially regularly spaced intervals from a location adjacent a leading end of said sheet support towards the trailing end thereof, each container having a leading edge and a liquid-dispensing mouth providing a trailing edge for the container, said containers being positioned to have their respective liquid-dispensing mouths extend transversely of said sheet support and to face in common the trailing end of said sheet support, each space on said support between a pair of successive containers providing an individual spreading surface over which the liquid of the leading container of said pair is adapted to be spread, each said container being adapted to be ruptured and the contents thereof discharged through the liquid-dispensing mouth thereof by the application thereto of opposed compressional forces directed from opposite sides of said sheet support and applied substantially uniformly across said sheet support by pressure-applying elements located on opposite sides of said support, the liquid released upon the rupture of a container being adapted to be spread over the spreading surface associated with said container upon relative movement between said sheet support and said compressional forces, each said spreading surface having an elongated portion extending towards the trailing end of said support from adjacent the mouth of the container associated with said spreading surface to provide an image-carrying portion for a photographic image adapted to be formed thereon upon release of said liquid, each said spreading surface also having a trapping portion over which liquid in excess of that spread over the image-carrying portion thereof is adapted to be collected and trapped, the trapping portion of each said spreading surface providing an extension of said spreading surface beyond the image-carrying portion thereof in a direction towards the trailing end of the sheet support and carried on said trapping portion of said spreading surface for bodily movement with said sheet support, at least one tapered and durable member which is capable of retaining its general shape under the application of pressure to opposed surfaces thereof and which occupies an area of said sheet support that is substantially smaller than the area of said trapping portion, each said tapered member having a face thereof extending above that spreading surface of said sheet support with which it is associated and also having at least one face provided with edges which diverge in a direction longitudinally of said support and away from the image-carrying portion of the support with which said tapered member is associated so that a cross-sectional area is imparted to each said tapered member which increases in said direction whereby each said tapered member is capable of gradually separating said elements as it becomes engaged between said elements upon relative movement of said sheet support with respect to said compressional forces to arrest the spreading of said liquid and to produce a space between the trapping portion of each spreading surface of said sheet support and that pressure-applying element which overlies said spreading surface for collecting and trapping said liquid on parts of each said trapping portion adjacent the tapered member associated therewith.

14. A photographic product as defined in claim 13 wherein each said trapping portion of said sheet support has a pair of tapered members carried thereon in spaced relation and aligned transversely of said sheet support adjacent longitudinal edges of said sheet support, and wherein an additional pair of spaced-apart tapered members are carried on said sheet support at a location adjacent the leading edge of the container located the nearest to the leading end of said sheet support and on the same side of said support as said other tapered members, each said tapered member having a hole therethrough providing means, engageable with camera stop mechanism, for positioning said sheet support in predetermined relation to means for applying said compressional forces to said sheet support.

OTTO E. WOLFF.
MURRY N. FAIRBANK.

References Cited in the file of this patent

UNITED STATES PATENTS

| Number | Name | Date |
|---|---|---|
| 661,504 | Ehlman | Nov. 13, 1900 |
| 935,156 | Kelley | Sept. 30, 1909 |
| 1,269,365 | Baker | June 11, 1918 |
| 1,277,048 | de Brayer | Aug. 27, 1918 |
| 1,332,985 | Jarrett | Mar. 9, 1920 |
| 1,342,248 | Bloomquist | June 1, 1920 |
| 1,381,840 | Jeapes | June 14, 1921 |
| 1,467,543 | Hansen | Sept. 11, 1923 |
| 1,631,478 | Favour | June 7, 1927 |
| 2,054,448 | Russell | Sept. 15, 1936 |
| 2,188,779 | Roehrl | Jan. 30, 1940 |
| 2,209,914 | Gerber et al. | July 30, 1940 |
| 2,322,005 | Fierke | June 15, 1943 |
| 2,322,006 | Fierke | June 15, 1943 |
| 2,322,027 | Jelley | June 15, 1943 |
| 2,352,014 | Rott | June 20, 1944 |
| 2,543,181 | Land | Feb. 27, 1951 |

FOREIGN PATENTS

| Number | Country | Date |
|---|---|---|
| 370,821 | Germany | May 25, 1921 |
| 369,146 | Germany | Feb. 15, 1923 |
| 393,813 | Great Britain | June 15, 1933 |
| 879,995 | France | Mar. 5, 1942 |